United States Patent Office 3,144,446
Patented Aug. 11, 1964

3,144,446
MONO AND BIS N-(3α,17α-DIHYDROXY-11,20-DI-
OXO-5β-PREGNAN-21-YL) QUATERNARY AM-
MONIUM SALTS OF TRIETHYLENEDIAMINE
Robert B. Moffett, Kalamazoo, Mich., assignor to The
Upjohn Company, Kalamazoo, Mich., a corporation of
Delaware
No Drawing. Filed Dec. 20, 1963, Ser. No. 332,236
5 Claims. (Cl. 260—239.5)

This invention relates to mono and bis quaternary ammonium salts of triethylenediamine and to processes for their preparation and is more particularly concerned with the mono and bis N-(3α,17α-dihydroxy-11,20-dioxo-5β-pregnan-21-yl) quaternary ammonium salts of triethylenediamine and with processes for their preparation.

The compounds of the invention can be represented by the following formulae:

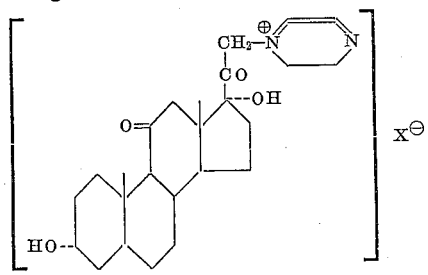

and

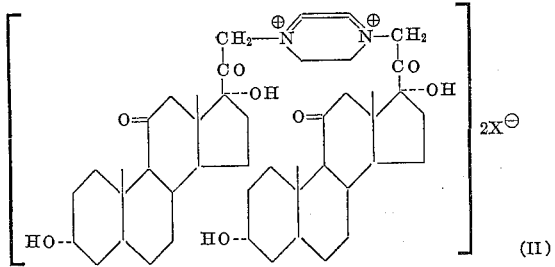

wherein X is the anion of a pharmacologically acceptable acid. The compounds of the invention also include the acid addition salts of the free bases of Formula I with pharmacologically acceptable acids, and the N-oxides of the compounds of Formula I and the acid addition salts of said N-oxides with pharmacologically acceptable acids.

The term "pharmacologically acceptable acids" is well recognized in the art and is inclusive of acids such as sulfuric, hydrochloric, hydrobromic, hydriodic, nitric, phosphoric, lactic, benzoic, methanesulfonic, p-toluenesulfonic salicylic, acetic, propionic, maleic, malic, tartaric, citric, cyclohexylsulfamic, succinic, nicotinic ascorbic acids and the like.

The novel compounds of the invention, i.e., the compounds of Formulae I and II above, the N-oxides of compounds of Formula I, and the acid addition salts of the compounds of Formula I and the N-oxides thereof with pharmacologically acceptable acids, possess pharmacological activity. Illustratively the compounds of the invention show antibacterial activity, ganglionic blocking activity, and central nervous system depressant activity. The antibacterial activity of the compounds of the invention renders them valuable for the control of bacterial organisms, both systemically and topically in mammals, and also for sterilization purposes, for example in the sterilization of surgical instruments and in related fields.

For purposes of administration to mammals, including animals of economic value, the novel compounds of the invention can be combined with solid and liquid pharmaceutical carriers and formulated in the form of tablets, powder packets, capsules and like solid dosage forms using starch and like excipients, or dissolved or suspended in suitable solvents or vehicles for oral or parenteral administration.

The novel compounds of the invention can be prepared conveniently by reacting triethylenediamine with the appropriate 21-halo-3α,17α-dihydroxy-11,20-dioxo-5β-pregnane, preferably with the 21-bromo- or 21-chloro derivative. The reaction is carried out advantageously in the presence of an inert solvent, for example, an alkanone such as acetone, methyl ethyl ketone, methyl isopropyl ketone and the like, or an alkanol such as methanol, ethanol, butyl alcohol and the like. Where the required product is the mono quaternary ammonium salt of Formula I the triethylenediamine and the halide can be employed in approximately stoichiometric quantities, i.e., equimolar quantities. It is preferred, however, to employ the triethylenediamine in excess. Where the required product is the bis quaternary ammonium salt of Formula II the quantities of reactants can be approximately stoichiometric, i.e., about 2 moles of the halide per mole of triethylenediamine. It is preferred, however, to employ the halide in excess.

The reaction is generally conducted at a temperature of the order of 20 to 30° C., although higher or lower temperatures can be employed if desired. Generally speaking the required product separates from solution and is isolated by filtration. If desired the compound so obtained can be purified by conventional procedures, for example by recrystallization.

The anion of the quaternary ammonium salts obtained as described above can be exchanged for any other desired anion, for example the anions of other pharmacologically acceptable acids, by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quaternary ammonium salt.

The acid addition salts of the compounds of Formula I above can be prepared by reacting the compound of Formula I with a pharmacologically acceptable acid in the presence of an inert solvent such as water, ether, and lower alkanols such as methanol, ethanol and the like.

The N-oxides of the invention can be prepared by reacting the mono N-oxide of triethylenediamine with an approximately equimolar proportion of the appropriate 21-halo-3α,17α-dihydroxy-11,20-dioxo-5β-pregnane, using the conditions described above for preparation of the quaternary ammonium salts of the invention.

The N-oxide acid addition salts of the invention can be prepared from the corresponding N-oxide and a pharmacologically acceptable acid using the procedures hereinbefore described for the prepartion of the acid addition salts of the compounds (I).

For the sake of simplicity the well-known trivial name triethylenediamine is employed herein. For indexing purposes Chemical Abstracts employs the systematic name 1,4-diazabicyclo[2.2.2]octane for this diamine. The system of nomenclature used in naming the novel quaternary ammonium salts of this invention is consistent with Chemical Abstracts practice.

The following examples illustrate the best method contemplated by the inventor for carrying out his invention.

EXAMPLE 1

*1-(3α,17α-Dihydroxy-11,20-Dioxo-5β-Pregnan-21-yl)-
4-Asa-1-Azoniabicyclo[2.2.2]Octane Bromide*

To a solution of 11.2 g. (0.1 mole) of triethylenediamine in 50 ml. of dry methyl ethyl ketone was added slowly, with stirring during 1.5 hr. at room temperature, a solution of 13.5 g. (0.03 mole) of 21-bromo-3α,17α-dihydroxy-11,20-dioxo-5β-pregnane (Kritchevsky et al., J. Am. Chem. Soc. 74, 483, 1952) in 150 ml. of dry methyl ethyl ketone. After standing at room temperature for 4 days and warming for a few minutes the solution was filtered from a gummy precipitate. The precipitate was dried in vacuo to give 15 g. of 1-(3α,17α-dihydroxy - 11,20 - dioxo - 5β - pregnan - 21 - yl) - 4-aza-1-azoniabicyclo[2.2.2]octane bromide in the form of a hydrate having a melting point of 250° C. (decomposition; sintering from 100° C.). A further 4.7 g. of this compound was obtained by diluting the mother liquor with absolute ether and recovering the precipitated solid. An analytical sample having a melting point of 263 to 266° C. (decomposition; sintering from 150° C.) was prepared by dissolving the compound in methanol and diluting the solution with absolute ether.

Analysis.—Calcd. for $C_{27}H_{43}BrN_2O_4 \cdot H_2O$: N, 5.02; Br, 14.33. Found: N, 4.93; Br, 14.67.

EXAMPLE 2

*1-(3α,17α-Dihydroxy - 11,20 - Dioxo - 5β-Pregnan-21-yl)-4-Aza-1-Azoniabicyclo[2.2.2]Octane Bromide Hydrobromide*

A solution of 19 g. of 1-(3α,17α-dihydroxy-11,20-dioxo - 5β - pregnan - 21 - yl) - 4 - aza - 1 - azoniabicyclo-[2.2.2]octane bromide in 180 ml. of water was acidified with 5 ml. of 48% hydrobromic acid. The resulting mixture was allowed to stand in the refrigerator and the solid which separated was isolated by filtration, washed with water and ethanol and dried. There was thus obtained 13.3 g. of 1-(3α,17α-dihydroxy-11,20-dioxo - 5β - pregnan - 21 - yl) - 4 - aza - 1 - azoniabicyclo-[2.2.2]octane bromide hydrobromide in the form of a crystalline solid having a melting point of 227 to 240° C. (sintering from 210° C.). A further 2.2 g. of the compound having a melting point of 245 to 265 C. (decomposition; sintering from 210 C.) was obtained by concentration of the mother liquor followed by addition of ethanol.

Samples dried for various lengths of time and at various temperatures were found by Karl Fischer analysis to contain from 0 to 3 molecules of water. A sample dried overnight at 100° C. under high vacuum was anhydrous and gave the following analysis.

Analysis.—Calcd. for $C_{27}H_{44}Br_2N_2O_4$: C, 52.26; H, 7.15; Br, 25.76; N, 4.52. Found: C, 52.63; H, 7.15; Br, 24.65; N, 4.54.

EXAMPLE 3

*1,4-Bis(3α,17α-Dihydroxy - 11,20 - Dioxo-5β-Pregnan-21-yl)-1,4-Diazoniabicyclo[2.2.2]Octane Dibromide*

A solution of 18.0 g. (0.04 mole) of 21-bromo-3α,17α-dihydroxy-11,20-dioxo-5β-pregnane and 1.685 g. (0.015 mole) of triethylenediamine in 200 ml. of dry methyl ethyl ketone was heated at 50° C. for 4 days. The solid which had separated was isolated by filtration and dried. There was thus obtained 10.3 g. of 1,4-bis(3α,17α-dihydroxy - 11,20 - dioxo - 5β - pregnan - 21 - yl) - 1,4-diazoniabicyclo[2.2.2]octane dibromide in the form of a hydrate having a melting point of 243 to 248° C. (sintering and darkening from 210° C.). A second crop of 1.9 g. was obtained by dilution of the mother liquors with absolute ether.

An anhydrous but hygroscopic analytical sample of material was obtained by drying at 100° C. in vacuo.

Analysis.—Calcd. for $C_{48}H_{74}Br_2N_2O_8$: Br, 16.53; N, 2.90; O, 13.24. Found: Br, 16.52; N, 3.22; O, 13.59.

Using the above procedure, but replacing 21-bromo-3α,17α - dihydroxy - 11,20 - dioxo - 5β - pregnane by 21-chloro - 3α,17α - dihydroxy - 11,20 - dioxo - 5β - pregnane (U.S. Patent 2,681,353) there can be obtained 1,4-bis-(3α,17α-dihydroxy-11,20 - dioxo - 5β - pregnan - 21 - yl)-1,4-diazoniabicyclo[2.2.2]octane dichloride.

EXAMPLE 4

*1,4-Bis(3α,17α-Dihydroxy-11,20-Dioxo-5β-Pregnan-21-yl)-1,4-Diazoniabicyclo[2.2.2]Octane Sulfate*

The above compound can be prepared as follows: A solution of 1,4-bis(3α,17α - dihydroxy - 11,20 - dioxo-5β-pregnan - 21 - yl)-1,4-diazoniabicyclo[2.2.2]octane dibromide in water is shaken with a suspension of silver oxide until the precipitation of silver bromide is complete. The resulting mixture is filtered and the filtrate containing the corresponding quaternary ammonium hydroxide is neutralized by the addition of aqueous sulfuric acid. The resulting mixture is evaporated to dryness. There can thus be obtained 1,4-bis(3α,17α-dihydroxy-11,20-dioxo-5β - pregnan - 21 - yl) - 1,4 - diazoniabicyclo-[2.2.2]octane sulfate.

Similarly, using the above procedure, but replacing sulfuric acid by other acids such as hydriodic, phosphoric, acetic, methanesulfonic and like acids, there can be obtained the corresponding quaternary ammonium salts.

In like manner, using the above procedure, the anion of any of the mono or bis quaternary ammonium salts of the invention can be exchanged by any other desired anion by forming the corresponding quaternary ammonium hydroxide and reacting the latter with the appropriate acid. When a mono quaternary ammonium salt is employed as starting material in the above procedure, excess acid can be used in the neutralization to give the desired mono quaternary ammonium salt in the form of the corresponding acid addition salt.

EXAMPLE 5

*1 - (3α,17α-Dihydroxy-11,20-Dioxo-5β-Pregnan-21-yl)-4-Aza-1-Azoniabicyclo[2.2.2]Octane N-Oxide Bromide*

The above compound can be prepared as follows: To a solution of 22.4 g. (0.2 mole) of triethylenediamine in 400 ml. of absolute ethanol is added, during 15 minutes with stirring at 20° C., 100 ml. of 30% aqueous hydrogen peroxide. The resulting mixture is allowed to stand for 4 days at room temperature and the excess hydrogen peroxide is then decomposed by the addition of an aqueous slurry of 0.5 g. of 30% platinum on charcoal. The mixture so obtained is stirred vigorously for 4 hrs. before being filtered through a filter aid. The filtrate (ethanolic solution of triethylenediamine mono-N-oxide) is cooled to 3° C. and a solution of 94.5 g. (0.21 mole) of 21-bromo-3α,17α-dihydroxy-11,20-dioxo-5β-pregnane in ethanol is added. The resulting mixture is allowed to stand overnight and is then concentrated to 500 ml., filtered and the filtrate diluted with ether. The solid which separates is isolated by filtration. There can thus be obtained 1-(3α,17α-dihydroxy-11,20-dioxo-5β - pregnan - 21 - yl) - 4 - aza - 1 - azoniabicyclo[2.2.2]-octane N-oxide bromide.

The N-oxide so obtained can then be converted to its hydrobromide using the procedure described in Example 2.

The anion of the N-oxide obtained as described above can be replaced by the anion of other pharmacologically acceptable acids using the procedure described in Example 4.

I claim:

1. A compound selected from the class consisting of (a) mono and bis quaternary ammonium salts of triethylenediamine having the formulae:

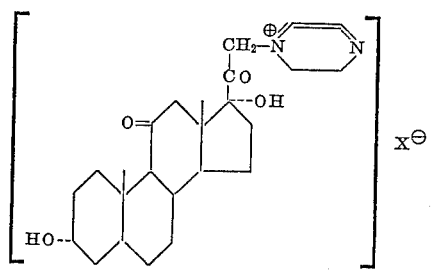

and

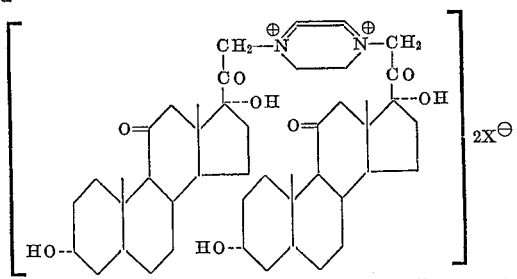

wherein X is the anion of a pharmacologically acceptable acid, and (b) the acid addition salts of the above mono quaternary ammonium salts with pharmacologically acceptable acids.

2. 1 - (3α,17α - dihydroxy - 11,20 - dioxo - 5β - pregnan-21-yl)-4-aza-1-azoniabicyclo[2.2.2]octane bromide.

3. 1 - (3α,17α - dihydroxy - 11,20 - dioxo - 5β - pregnan - 21 - yl) - 4 - aza - 1 - azoniabicyclo[2.2.2]octane bromide hydrobromide.

4. 1,4 - bis(3α,17α - dihydroxy - 11,20 - dioxo - 5β-pregnan - 21 - yl) - 1,4 - diazoniabicyclo[2.2.2]octane dibromide.

5. A compound selected from the class consisting of (a) N-oxides having the formula:

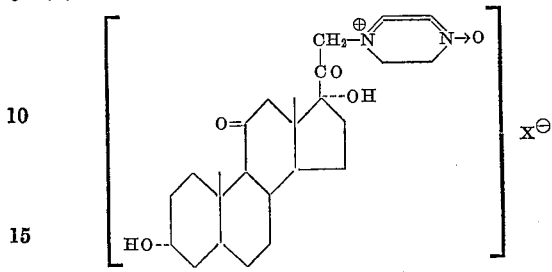

wherein X is the anion of a pharmacologically acceptable acid, and (b) the acid addition salts of the above N-oxides with pharmacologically acceptable acids.

No references cited.